United States Patent
Kawai et al.

(10) Patent No.: US 8,912,780 B2
(45) Date of Patent: Dec. 16, 2014

(54) SWITCHING CONTROL CIRCUIT

(75) Inventors: Shuhei Kawai, Ota (JP); Iwao Fukushi, Oizumi-machi (JP); Masahiro Maruki, Oizumi-machi (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 518 days.

(21) Appl. No.: 13/028,669

(22) Filed: Feb. 16, 2011

(65) Prior Publication Data

US 2011/0199145 A1 Aug. 18, 2011

(30) Foreign Application Priority Data

Feb. 16, 2010 (JP) .................................. 2010-031531

(51) Int. Cl.
H02M 3/156 (2006.01)
(52) U.S. Cl.
CPC ...................................... *H02M 3/156* (2013.01)
USPC ......................................... 323/284; 323/285
(58) Field of Classification Search
USPC .................. 323/282, 283, 284, 285, 271, 234
See application file for complete search history.

(56) References Cited

U.S. PATENT DOCUMENTS

| 6,366,066 B1* | 4/2002 | Wilcox ......................... 323/282 |
| 6,828,766 B2* | 12/2004 | Corva et al. .................... 323/284 |
| 7,482,791 B2* | 1/2009 | Stoichita et al. ............... 323/271 |
| 2002/0008501 A1* | 1/2002 | Telefus et al. .................. 323/282 |
| 2009/0219000 A1* | 9/2009 | Yang .............................. 323/282 |
| 2009/0251219 A1* | 10/2009 | Fiocchi et al. ................. 330/291 |
| 2010/0289471 A1* | 11/2010 | Kasai et al. .................... 323/282 |

FOREIGN PATENT DOCUMENTS

JP 2009-261100 A 11/2009

* cited by examiner

*Primary Examiner* — Gary L Laxton
*Assistant Examiner* — Trinh Dang

(57) ABSTRACT

A switching-control circuit to control switching of a transistor whose input electrode is applied with an input voltage, and turn off the transistor, when an output current from the transistor is greater than a reference current, includes: a reference-voltage-generating circuit to generate such a first-reference voltage that the reference current is reduced with reduction in an output voltage; a comparing circuit to compare a voltage corresponding to the output current with the first-reference voltage; and a driving circuit to turn on/off the transistor based on a feedback voltage corresponding to the output voltage and a second reference voltage corresponding to a target level so that the output voltage reaches the target level, when the comparing circuit determines that the output current is smaller than the reference current, and turn off the transistor when the comparing circuit determines that the output current is greater than the reference current.

20 Claims, 5 Drawing Sheets us 8,912,780 b2

SWITCHING CONTROL CIRCUIT

CROSS-REFERENCE TO RELATED APPLICATION

This application claims the benefit of priority to Japanese Patent Application No. 2010-031531, filed Feb. 16, 2010, of which full contents are incorporated herein by reference.

BACKGROUND OF THE INVENTION

1. Field of the Invention

The present invention relates to a switching control circuit.

2. Description of the Related Art

A common switching power supply circuit includes an overcurrent protecting circuit configured to prevent a current, which is greater than or equal to a predetermined current, from passing through a power transistor configured to drive a load. For example, a pulse-by-pulse-method overcurrent protecting circuit is known as the overcurrent protecting circuit, that is configured to detect whether the current passing through the power transistor is greater than or equal to the predetermined current, that is, whether the current is an overcurrent for each switching cycle, and turn off the power transistor when the current is an overcurrent, (see, e.g., Japanese Laid-Open Patent Publication No. 2009-261100).

When the load is short-circuited in a switching power supply circuit that employs the pulse-by-pulse-method overcurrent protecting circuit, an overcurrent passes through the power transistor in every switching cycle. Therefore, if the short circuit of the load is continued for a long time, the power transistor, etc., may be broken.

SUMMARY OF THE INVENTION

A switching control circuit according to an aspect of the present invention, which controls switching of a transistor whose input electrode is applied with an input voltage, and turns off the transistor when an output current from the transistor is greater than a reference current in order to generate an output voltage of a target level from the input voltage, includes: a reference voltage generating circuit configured to generate such a first reference voltage that the reference current is reduced with reduction in the output voltage; a comparing circuit configured to compare a voltage corresponding to the output current with the first reference voltage; and a driving circuit configured to turn on/off the transistor based on a feedback voltage corresponding to the output voltage and a second reference voltage corresponding to the target level so that the output voltage reaches the target level, when the comparing circuit determines that the output current is smaller than the reference current, and turn off the transistor when the comparing circuit determines that the output current is greater than the reference current.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
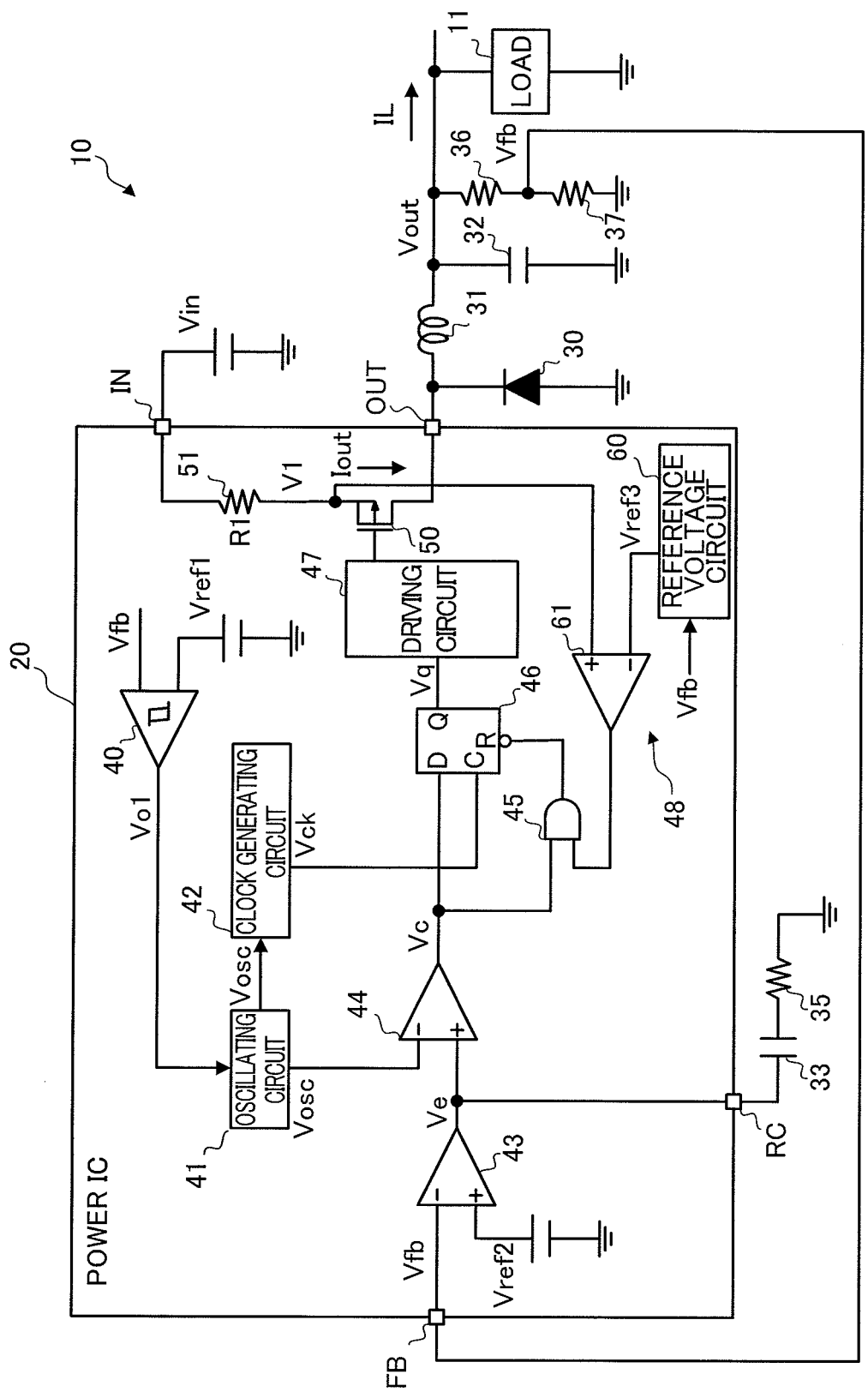
FIG. 1 is a diagram illustrating a configuration of a switching power supply circuit 10 according to an embodiment of the present invention.

FIG. 1 is a diagram illustrating the configuration of a switching power supply circuit 10 according to an embodiment of the present invention. The switching power supply circuit 10 is a circuit configured to generate a desired output voltage Vout from an input voltage Vin and includes a power supply IC 20, a diode 30, an inductor 31, capacitors 32 and 33, and resistors 35 to 37, for example.

A load 11 is an integrated circuit such as a CPU (Central Processing Unit), for example, and operates using the output voltage Vout as a power supply voltage thereof.

The power supply IC 20 (switching control circuit) is an integrated circuit that includes terminals IN, OUT, RC, and FB. The terminal IN is applied with the input voltage Vin. The terminal OUT is connected to the diode 30 and the inductor 31. The diode 30 is an element to pass a current through the inductor 31 when a PMOS transistor 50, which will be described later, is off.

The inductor 31 and the capacitor 32 are included in a low-pass filter that is configured to attenuate a high-frequency component of the voltage at the terminal OUT. Therefore, the output voltage Vout at a DC level is generated at the capacitor 32.

The terminal FB is applied with a feedback voltage Vfb that is a voltage acquired by dividing the output voltage Vout using the resistors 36 and 37. The terminal RC is connected to the resistor 35 and the capacitor 33 for so-called phase compensation for preventing an oscillation of the output voltage Vout.

The power supply IC 20 includes a hysteresis comparator 40, an oscillating circuit 41, a clock generating circuit 42, an error amplifying circuit 43, a comparator 44, an AND circuit 45, a D-flip flop 46, a driving circuit 47, an overcurrent detecting circuit 48, the PMOS transistor 50, and a resistor 51. The hysteresis comparator 40, the oscillating circuit 41, the clock generating circuit 42, the error amplifying circuit 43, the comparator 44, the AND circuit 45, the D-flip flop 46, and the driving circuit 47 correspond to a driving circuit. The comparator 44, the AND circuit 45, the D-flip flop 46, and the driving circuit 47 correspond to a control circuit.

The hysteresis comparator 40 compares hysteresis voltages (Vb1 and Vb2) that are determined based on a predetermined reference voltage Vref1 with the feedback voltage Vfb that is applied to the terminal FB, and varies an output voltage Vo1. The hysteresis comparator 40 changes the level of the output voltage Vo1 to a high level (hereinafter, "high"), for example, when the feedback voltage Vfb becomes higher than the voltage Vb1, and changes the level of the output voltage Vo1 to a low level (hereinafter, "low"), for example, when the feedback voltage Vfb becomes lower than the voltage Vb2 (voltage Vb1>voltage Vb2). The level of the voltage Vb2 corresponds to a second level.

The oscillating circuit 41 outputs a sawtooth oscillating signal Vosc having a frequency f1 when the output voltage Vo1 goes high, and outputs the sawtooth oscillating signal Vosc having a frequency f2 that is lower than the frequency f1 when the output voltage Vo1 goes low.

The clock generating circuit 42 outputs a clock signal Vck which goes high when (at timing at which) the oscillating signal Vosc changes from a falling edge thereof to a rising edge thereof.

The error amplifying circuit 43 is a circuit configured to amplify an error between the feedback voltage Vfb applied to the terminal FB and a predetermined reference voltage Vref2. The reference voltage Vref2 (second reference voltage) is a voltage that is determined corresponding to the desired output voltage Vout. The capacitor 33 and the resistor 35 for phase compensation are connected between an output of the error amplifying circuit 43 and a ground GND, through the terminal RC. A voltage at a node at which the output of the error amplifying circuit 43 and the terminal RC are connected to each other is denoted by a voltage Ve.

The comparator 44 compares magnitudes between the voltage Ve and the oscillating signal Vosc, and varies a voltage Vc to be output therefrom. Here, the voltage Ve is applied to a non-inverting input terminal of the comparator 44, and the oscillating signal Vosc is applied to an inverting input terminal of the comparator 44. Therefore, when the oscillating signal Vosc becomes lower in level than the voltage Ve, the voltage Vc goes high, and when the oscillating signal Vosc becomes higher in level than the voltage Ve, the voltage Vc goes low.

The AND circuit 45 performs a logical AND of the voltage Vc and an output from the overcurrent detecting circuit 48 which will be described later, and outputs the result to the D-flip flop 46.

The voltage Vc is input to a D-input of the D-flop flop 46; the clock signal Vck is input to a C-input thereof; and the output of the AND circuit 45 is input to an R-input thereof. Therefore, when the output from the AND circuit 45 is high, the logic level of the voltage Vc at the time when the clock signal Vck is high is output form a Q-output. On the other hand, when the output from the AND circuit 45 is low, the D-flip flop 46 is reset and the Q-output goes low.

The driving circuit 47 performs switching for the PMOS transistor 50 based on a voltage Vq of the Q-output of the D-flip flop 46. More specifically, when the voltage Vq goes high, the driving circuit 47 turns on the PMOS transistor 50. On the other hand, when the voltage Vq goes low, the driving circuit 47 turns off the PMOS transistor 50.

The overcurrent detecting circuit 48 detects whether or not a current Iout from the PMOS transistor 50 is an overcurrent, that is, whether or not the current Iout is greater than or equal to a reference current that is a criterion as to whether the current Iout is an overcurrent. The overcurrent detecting circuit 48 includes a reference voltage circuit 60 and a comparator 61. When the current Iout is greater than the reference current, the overcurrent detecting circuit 48 detects that the current Iout is an overcurrent.

The PMOS transistor 50 is a power transistor configured to drive the load 11 and a source electrode (input electrode) thereof is applied with an input voltage Vin through the resistor 51.

The resistor 51 is a detection resistor configured to detect the output current Iout. A voltage at a node at which the resistor 51 and the source electrode of the PMOS transistor 50 are connected to each other is denoted by a voltage V1. When the resistance value of the resistor 51 is denoted by R1, for example, the voltage V1 is expressed by V1=Vin−R1×Iout. Therefore, the voltage V1 is reduced when the output current Iout is increased.

The reference voltage circuit 60 (reference voltage generating circuit) is a circuit configured to output a reference voltage Vref3 (first reference voltage) corresponding to the reference current. The reference voltage circuit 60 varies the level of the reference voltage Vref3 with the level of the feedback voltage Vfb. Therefore, the reference current that is the criterion for determining whether a current is an overcurrent is varied with the feedback voltage Vfb. The details of the reference voltage circuit 60 will be described later.

The comparator 61 is a circuit configured to compare the voltage V1 and the reference voltage Vref3 with each other so as to determine whether or not the output current Iout is an overcurrent. As described above, the voltage V1 is reduced when the output current Iout is increased. When the voltage V1 is higher than the reference voltage Vref3, the comparator 61 outputs a voltage Vo2 whose level is high, which indicates that the output current Iout is not an overcurrent. On the other hand, when the voltage V1 is lower than the reference voltage Vref3, the comparator 61 outputs the voltage Vo2 whose level is low, which indicates that the output current Iout is an overcurrent.

==Details of Reference Voltage Circuit 60==

Figure 2:
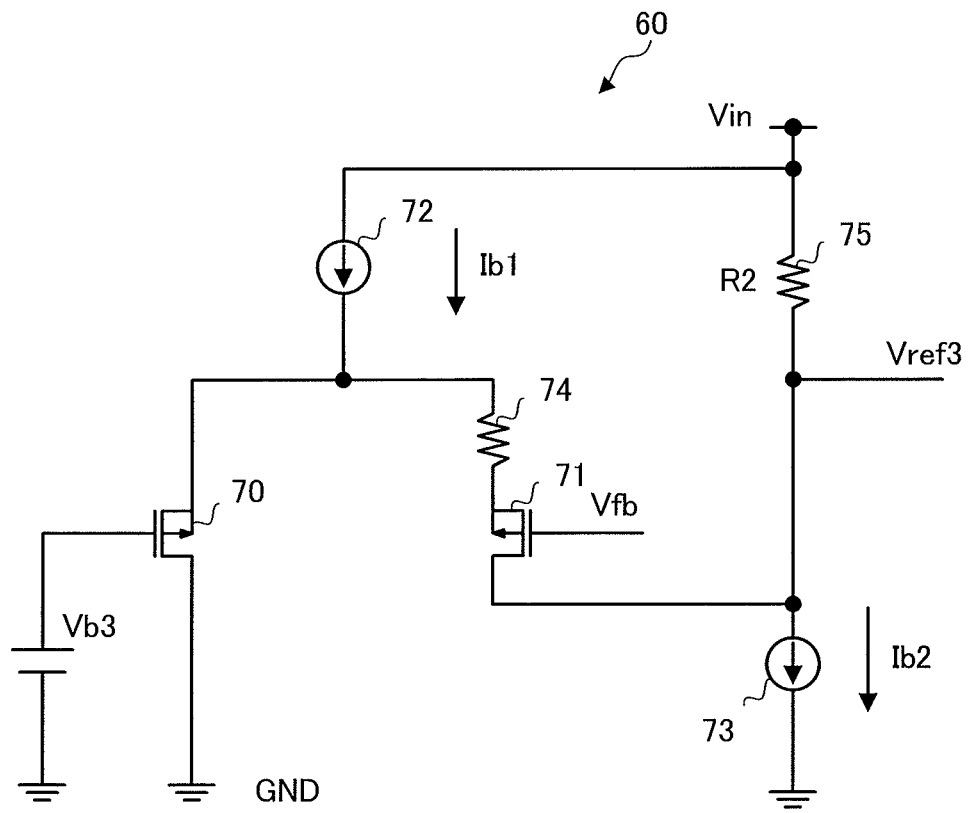
FIG. 2 is a diagram illustrating a configuration of a reference voltage circuit 60.

As depicted in FIG. 2, the reference voltage circuit 60 includes PMOS transistors 70 and 71, bias current sources 72 and 73, and resistors 74 and 75. The PMOS transistors 70 and 71, the bias current sources 72 and 73, and the resistor 74 correspond to a bias current circuit.

A source electrode of the PMOS transistor 70 is connected to a source electrode of the PMOS transistor 71 through the resistor 74. A predetermined bias current Ib1 from the bias current source 72 is supplied to a node at which the source electrode of the PMOS transistor 70 and the resistor 74 are connected. Therefore, the PMOS transistors 70 and 71, the bias current source 72, and the resistor 74 are included in a differential circuit. The resistor 74 is a so-called source resistor of the PMOS transistor 71.

Here, a gate electrode of the PMOS transistor 70 is applied with a voltage Vb3 of a predetermined level and a gate electrode of the PMOS transistor 71 is applied with the feedback voltage Vfb. Therefore, when the feedback voltage Vfb becomes higher than the voltage Vb3, the PMOS transistor 70 is turned on and the PMOS transistor 71 is turned off. As a result, in this case, the bias current Ib1 is supplied to the PMOS transistor 70. On the other hand, when the feedback voltage Vfb is reduced and becomes lower than the voltage Vb3, the current passing through the PMOS transistor 70 is gradually reduced and the current passing through the PMOS transistor 71 is gradually increased, as the feedback voltage Vfb is reduced. In an embodiment of the present invention, it is assumed that the PMOS transistors 70 and 71 are designed such that, when the feedback voltage Vfb is reduced and becomes equal to a voltage Vb4, which is lower than the voltage Vb3, the whole bias current Ib1 is passing through the PMOS transistor 71, for example.

The bias current source 73 generates a bias current Ib2, which is greater than the bias current Ib1. An end of the bias current source 73 is connected to an end of the resistor 75 and a drain electrode of the PMOS transistor 71. In an embodiment of the present invention, a voltage is denoted by a reference voltage Vref3 which is generated at a node at which the bias current source 73 and the resistor 75 are connected, and the resistance value of the resistor 75 is denoted by R2.

Figure 3:
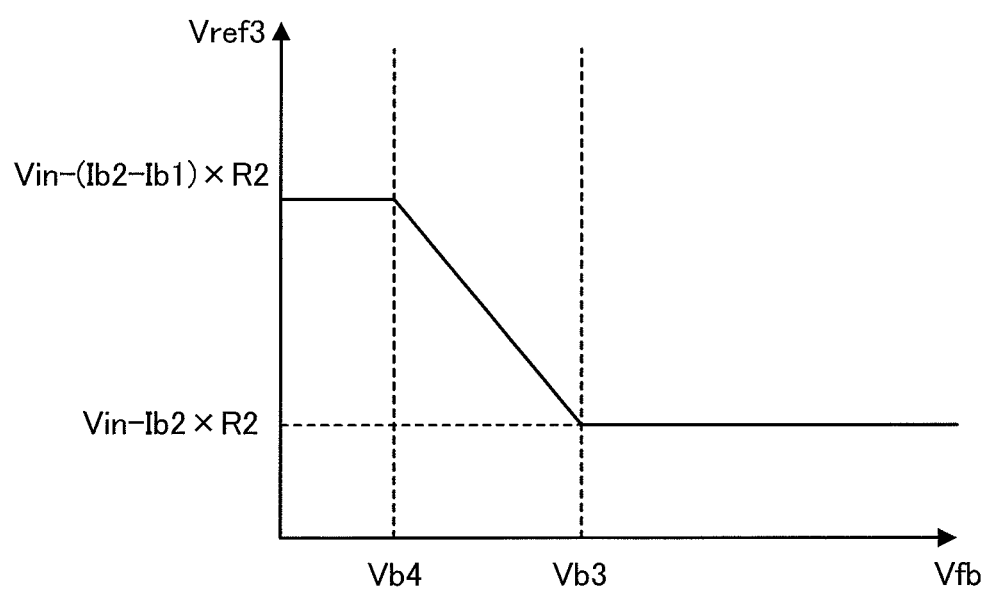
FIG. 3 is a diagram illustrating an operation of a reference voltage circuit 60.

An operation of the reference voltage circuit 60 will be described with reference to FIG. 3. The PMOS transistors 71 is off and the current passing therethrough is zero when the voltages Vfb and Vb3 are in a range of Vfb>Vb3, and therefore, the whole bias current Ib2 is passing through the resistor 75. As a result, the reference voltage Vref3 is expressed by Vref3=Vin−Ib2×R2.

Subsequently, when the voltage Vfb becomes lower than the voltage Vb3, the current passing through the PMOS transistor 71 is gradually increased as described above. Here, since the bias current Ib2 of the bias current source 73 is constant, the current passing through the resistor 75 is reduced as a result. Therefore, the reference voltage Vref3 is increased with the reduction in the feedback voltage Vfb. When the feedback voltage Vfb is reduced and becomes equal to the voltage Vb4, the whole bias current Ib1 is passing through the PMOS transistor 71, and thus, the current passing through the resistor 75 is expressed by Ib2−Ib1. Therefore, the reference voltage Vref3 is expressed by Vref3=Vin−(Ib2−Ib1)×R2 when the voltages Vfb and Vb4 are in a range of Vfb<Vb4. In this manner, the reference voltage circuit 60 outputs the reference voltage Vref3, which is increased with the reduction in the feedback voltage Vfb. As described above, the reference voltage Vref3 is a voltage that is the criterion to determine whether or not the output current Iout is an overcurrent. The voltage V1 which is compared with the reference voltage Vref3 is reduced with the increase of the output current Iout. Therefore, when the reference voltage Vref3 is increased in level, the reference current, by which the comparator 61 determines that a current is an overcurrent, becomes smaller. In this manner, the reference voltage circuit 60 increases the reference current, which is used when it is determined whether or not the output current Iout is an overcurrent, with the reduction in the feedback voltage Vfb. The level of the voltage Vb3 corresponds to a first level.

==Operation of Switching Power Supply Circuit 10 Executed when Load is not Short-Circuited==

Figure 4:
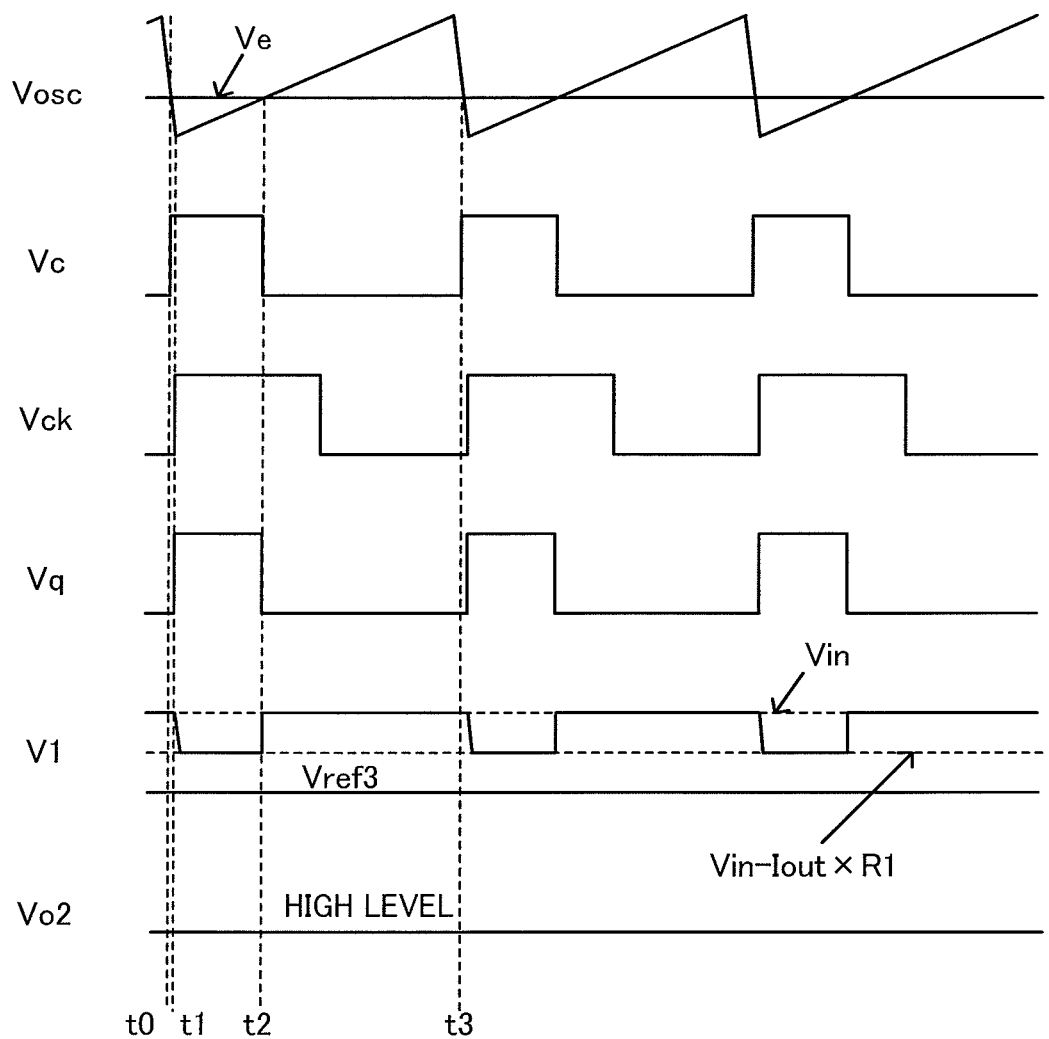
FIG. 4 is a diagram illustrating an operation of a switching power supply circuit 10 when a load is not short-circuited.

A description will be given, with reference to FIG. 4, of an example of an operation of the switching power supply circuit 10 executed when the load is not short-circuited. Here, it is assumed that the switching power supply circuit 10 generates the output voltage Vout of a desired level, and the average value of a load current IL passing through the load 11, is a current 1A. The resistors 36 and 37 are selected such that the feedback voltage Vfb at the time when the output voltage Vout of the desired level is generated is higher than the voltage Vb1 of the hysteresis comparator 40. Therefore, the output voltage Vo1 from the hysteresis comparator 40 is high and the oscillating signal Vosc has a frequency of f1. Further, when the load 11 is driven on the above condition, the reference voltage circuit 60 is designed such that the minimal level of the voltage V1 is higher than the voltage Vref3.

When the oscillating signal Vosc becomes lower in level than the voltage Ve at time t0, the voltage Vc goes high. When the clock signal Vck goes high at time t1 at which the oscillating signal Vosc rises, the voltage Vq goes high. Therefore, the PMOS transistor 50 is turned on. When the PMOS transistor 50 is turned on, the output current Iout flows, and therefore, the voltage V1 is reduced from Vin by Iout×R1. As described above, the minimal level of the voltage V1 at the time when the load current IL is equal to the current IA is higher than the level of the reference voltage Vref3, and therefore, the voltage Vo2 is always high. Thus, the output of the AND circuit 45 is high.

When the oscillating signal Vosc becomes higher in level than the voltage Ve at time t2, the voltage Vc goes low. As a result, the output of the AND circuit goes low and the D-flip flop 46 is reset. Therefore, the voltage Vq goes low and the PMOS transistor 50 is turned off. When the oscillating signal Vosc becomes lower in level than the voltage Ve at time t3, the voltage Vc goes high as is the case with the time t0. At the time t3 and thereafter, the operation of from the time t0 to t3 is repeated.

Here, for example, when the output voltage Vout is increased, the feedback voltage Vfb is increased. When the feedback voltage Vfb becomes higher than the reference voltage Vref2, the voltage Ve is reduced. Thus, the time period during which the voltage Vq is high, that is, the time period during which the PMOS transistor 50 is on becomes shorter and the output voltage Vout is reduced. Therefore, the output voltage Vout and the feedback voltage Vfb, which have been increased, are reduced. On the other hand, when the output voltage Vout is reduced, the feedback voltage Vfb is also reduced. When the feedback voltage Vfb becomes lower than the reference voltage Vref2, the voltage Ve is increased. Therefore, the time period during which the voltage Vq is high, that is, the time period during which the PMOS transistor 50 is off becomes longer. As a result, the output voltage Vout and the feedback voltage Vfb, which have been reduced, are increased. In this manner, the feedback voltage Vfb is feedback-controlled so as to coincide with the reference voltage Vref, and the power supply IC 20 continues generating the desired voltage Vout.

==Operation of Switching Power Supply Circuit 10 Executed when Load is Short-Circuited==

Figure 5:
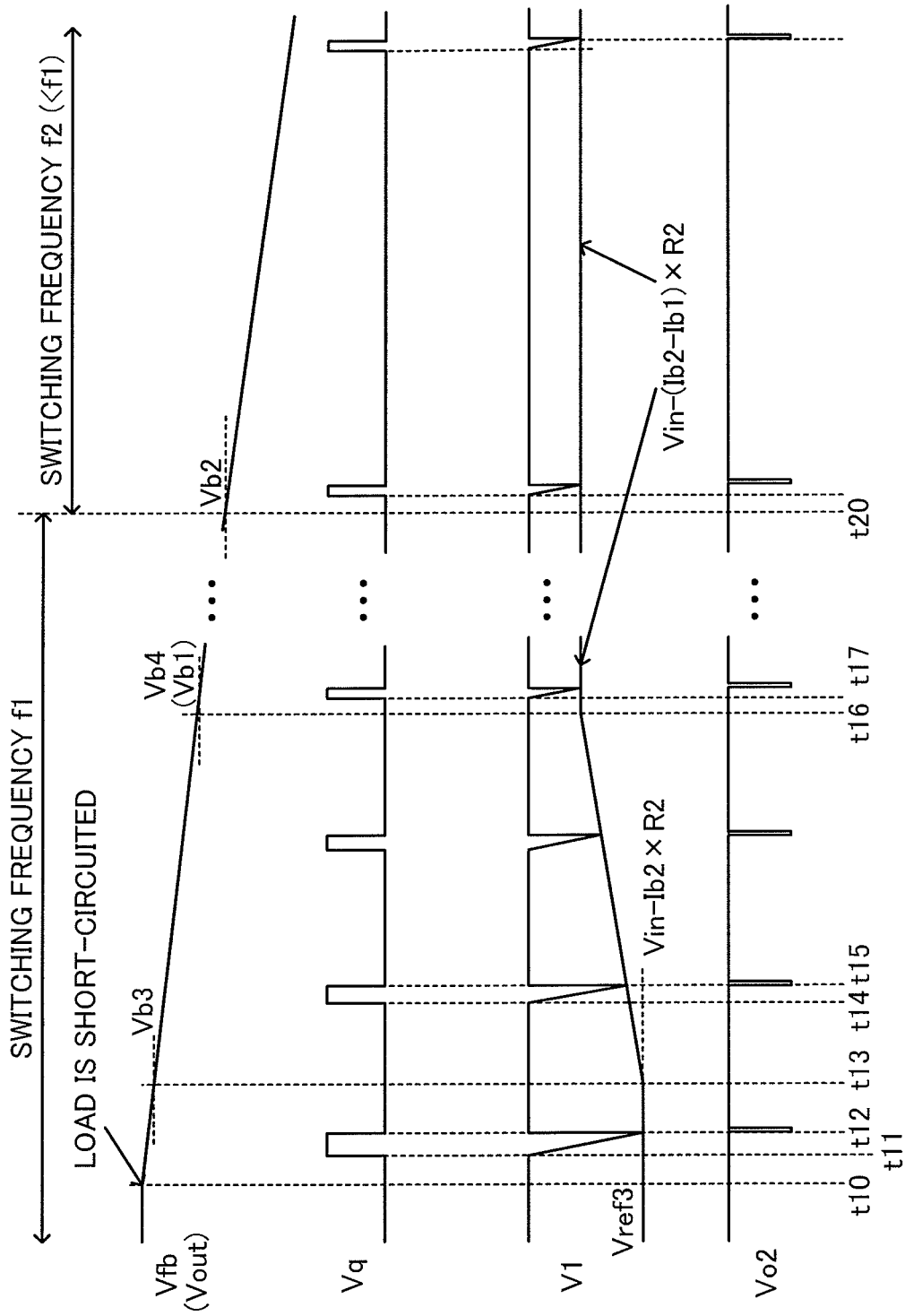
FIG. 5 is a diagram illustrating an operation of a switching power supply circuit 10 when a load is short-circuited.

A description will be given, with reference to FIG. 5, of an example of an operation of the switching power supply circuit 10 executed when the load is short-circuited due to an accident, etc. When the load is short-circuited, an electrically short-circuited state substantially occurs in the terminal OUT and the ground GND. Therefore, the output voltage Vout is reduced to 0 V from the desired level. When the PMOS transistor 50 is turned on in such a state, the current from the power source that generates the input voltage Vin flows to the ground through the resistor 51 and an on-resistor of the PMOS transistor 50. In an embodiment of the present invention, it is assumed that the level of the reference voltage Vref3 is set so that the voltage V1, which is generated by the PMOS transistor 50 being turned on when the load is short-circuited, is lower in level than the reference voltage Vref3 (=Vin−Ib2×R2). In an embodiment of the present invention, the hysteresis comparator 40 is designed so that the voltage Vb1 is equal in level to the voltage Vb4, for example.

When the load is short-circuited at time t10, the output voltage Vout is reduced from the desired level. As described above, when the output voltage Vout is reduced from the desired level, the driving circuit 47 drives the PMOS transistor 50 so that the output voltage Vout is increased. At this time, the feedback voltage Vfb is higher in level than the voltage Vb1 of the hysteresis comparator 40, and therefore, switching is performed for the PMOS transistor 50 at the frequency f1. When the voltage Vq goes high at time t11, the PMOS transistor 50 is turned on, and therefore, the output current Iout is increased from zero and the voltage V1 is reduced. As described above, in the case where the load is short-circuited, the voltage V1 at the time when the PMOS transistor 50 is turned on becomes lower than the reference voltage Vref3 (=Vin−Ib2×R2). Therefore, it is detected that the output current Iout is an overcurrent and the comparator 61 outputs the voltage Vo2 whose level is high which indicates that the output current Iout is an overcurrent. When the voltage Vo2 goes low, the D-flip flop 46 is reset, and therefore, the voltage Vq goes low and the PMOS transistor 50 is turned off. In the case where the load is short-circuited, when the overcurrent detecting circuit 48 detects that the output current Iout is an overcurrent, the PMOS transistor 50 is forcibly turned off.

Subsequently, when the feedback voltage Vfb becomes equal to the voltage Vb3 at time t13 according to the reduction in the output voltage Vout, the reference voltage circuit 60 increases the level of the reference voltage Vref3 according to the reduction in the feedback voltage Vfb. When one cycle of the oscillating signal Vosc has elapsed at time t14 since the time t11, the voltage Vq goes high and the PMOS transistor 50 is turned on, and therefore, the voltage V1 is reduced. When the voltage V1 becomes lower than the reference voltage Vref3 at time t15, the PMOS transistor 50 is turned off. In this manner, when the reference voltage Vref3 is increased at the time t13 and thereafter, the time period from the turning on of the PMOS transistor 50 to the turning off thereof becomes shorter. Thus, the average value of the output current Iout per cycle of the oscillating signal Vosc is reduced.

When the feedback voltage Vfb becomes equal to the voltage Vb4 according to the reduction in the output voltage Vout at time t16, the reference voltage Vref3 becomes a predetermined level (Vin−(Ib2−Ib1)×R2). Then, the PMOS transistor 50 is turned on at time t17. When the voltage V1 becomes lower than the reference voltage Vref3 at time t18, the PMOS transistor 50 is turned off. As described above, the reference voltage circuit 60 does not increase the reference voltage Vref3 to a level higher than or equal to the predetermined level (Vin−(Ib2−Ib1)×R2) even when the feedback voltage Vfb is reduced. Therefore, at the time t16 and thereafter, the time period, during which the PMOS transistor 50 is on, does not become shorter. Therefore, at the time t16 and thereafter, the average value of the output current Iout per cycle of the oscillating signal Vosc is not reduced.

When the feedback voltage Vfb becomes equal to the voltage Vb2 according to the reduction in the output voltage Vout at time t20, the hysteresis comparator 40 changes the voltage V01 to low. As a result, the oscillating circuit 41 outputs the sawtooth oscillating signal Vosc at the frequency f2 which is lower than the frequency f1. Thus, switching is performed for the PMOS transistor 50 at the frequency f2 which is lower than the frequency f1. As a result, when the oscillating signal Vosc is reduced in frequency, the average value of the output current Iout per predetermined time period is also reduced.

Figure 6:
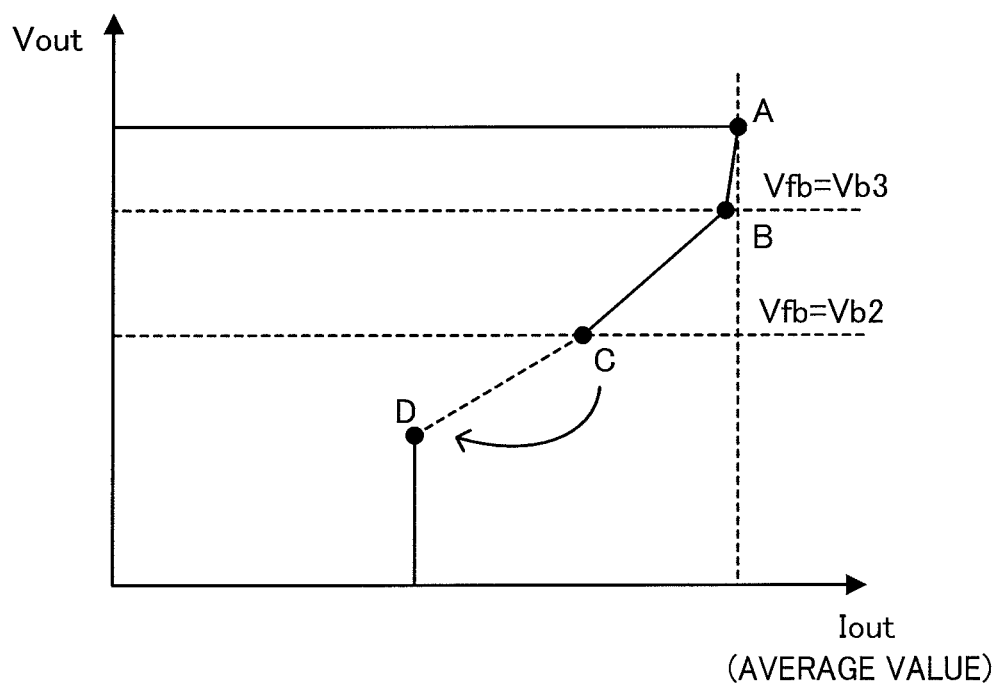
FIG. 6 is a diagram of a relationship between an output voltage Vout and an output current Iout when a load is short-circuited.

A description will be given, with reference to FIG. 6, of a relationship between the output voltage Vout at the time when the load is short-circuited and the average value of the output current Iout. When the load is short-circuited (point A), the PMOS transistor 50 is forcibly turned off, and therefore, the average value of the output current Iout is reduced. When the output voltage Vout is reduced and the feedback voltage Vfb becomes equal in level to the voltage Vb3 (point B), the average value of the output current Iout for one cycle of the oscillating signal Vosc is further reduced. When the output voltage Vout is reduced and the feedback voltage Vfb becomes equal in level to the voltage Vb2 (point C), the frequency of the oscillating signal Vosc is changed from f1 to f2. As a result, as indicated by a point D, for example, the average values of the output voltage Vout and the output current Iout are smaller than those in the point C. After the operation point moves to the point D, an overcurrent of the PMOS transistor 50 is restrained on the same condition as that in the point D.

Hereinabove, the switching power supply circuit 10 according to an embodiment of the present invention has been described. The comparator 61 compares the voltage V1 corresponding to the output current Iout with the reference voltage Vref3 corresponding to the reference current which is the criterion for determining an overcurrent. The reference voltage circuit 60 generates the reference voltage Vref3 which is such a voltage the reference current is reduced with the reduction in the output voltage Vout (feedback voltage Vfb).

Therefore, in an embodiment of the present invention, for example, when the load is short-circuited and the level of the output voltage Vout is reduced from its target level, a current value indicating that the output current Iout is an overcurrent, that is, a so-called overcurrent limit value is reduced. When the comparator 61 detects an overcurrent, the driving circuit 47 turns off the PMOS transistor 50. Therefore, in an embodiment of the present invention, even when the load is short-circuited, the output current Iout passing through the PMOS transistor 50 can be reduced and destruction of the PMOS transistor 50 caused by the overcurrent can be suppressed, as compared to the case where the overcurrent limit value is fixed, for example.

In general, the output voltage Vout is also reduced when the load current IL of the load 11 is suddenly increased, for example. In the case where the load is suddenly changed and the output voltage Vout is transitionally reduced as described above, when the overcurrent limit value is reduced, the PMOS transistor 50 may forcibly be turned off. As a result, it becomes difficult to change the output voltage Vout which has been reduced to a target level in a short time period. In an embodiment of the present invention, the feedback voltage Vfb at the time when the reference voltage Vref3 is changed is equal in level to the voltage Vb3, and the level of the voltage Vb3 can arbitrarily be set. Therefore, the level of the voltage Vb3 can be set at a value lower than the minimal value of the output voltage Vout that is an assumed value when the load is suddenly changed, for example. The voltage Vb3 is set as such, so that the overcurrent limit value can be reduced only when the load is short-circuited.

In an embodiment of the present invention, the reference voltage Vref3 is gradually increased with the reduction in the output voltage Vout. However, when the output voltage Vout becomes equal to the voltage Vb3, the reference voltage Vref3 may drastically be changed from Vin−Ib2×R2 to Vin−(Ib2−Ib1)×R2, for example. The short circuit of the load may be solved in a short time period depending on an accident, etc. When the short circuit of the load is eliminated, if the reference voltage Vref3 is great in value, that is, when the overcurrent limit value is small, a charging current for the capacitor 32 is limited so that it becomes difficult to change the output voltage Vout to the target level in a short time period. In an embodiment of the present invention, the reference voltage Vref3 is gradually increased with the reduction in the output voltage Vout. Thus, when the short circuit of the load is eliminated in a short time period, the output voltage Vout can be changed to a target level in a short time period.

When the feedback voltage Vfb becomes equal to the voltage Vb2, the hysteresis comparator 40 reduces the frequency of the oscillating signal Vosc of the oscillating circuit 41 from f1 to f2. When the frequency of the oscillating signal Vosc is reduced, the average value of the output current Iout per predetermined time period is also reduced. Therefore, the possibility that the output current Iout is an overcurrent can be reduced so that the possibility that the PMOS transistor 50 is broken can further be reduced.

The time period during which the output voltage Vout is increased to a target level after the short circuit of the load is eliminated varies corresponding to the switching frequency, that is, the frequency of the oscillating signal Vosc. More specifically, if the oscillating signal Vosc is high in frequency, it can be increased to a target level in a short time period. In an embodiment of the present invention, the voltage Vb2, with which the frequency of the oscillating signal Vosc is reduced from f1 to f2, is lower than the voltage Vb3, with which the reference voltage Vref3 start being increased. Therefore, for example, when the short circuit of the load is eliminated before the feedback voltage becomes equal to the voltage Vb2, the output voltage Vout can be increased to a target level in a shorter time period.

The reference voltage circuit 60 varies the level of the reference voltage Vref3 according to the level of the feedback voltage Vfb that is acquired by dividing the output voltage Vout. However, this is not limitative. The reference voltage circuit 60 may vary the level of the reference voltage Vref3 directly based on the level of the output voltage Vout. Even in such a case, the same effect as that of the embodiment can be achieved, for example.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A switching control circuit configured to control switching of a transistor whose input electrode is applied with an input voltage, and turn off the transistor, when an output current from the transistor is greater than a reference current, in order to generate an output voltage of a target level from the input voltage, the switching control circuit comprising:
    a reference voltage generating circuit configured to generate such a first reference voltage that the reference current is reduced with reduction in the output voltage;
    a comparing circuit configured to compare a voltage corresponding to the output current with the first reference voltage; and
    a driving circuit configured to
        turn on/off the transistor based on a feedback voltage corresponding to the output voltage and a second reference voltage corresponding to the target level so that the output voltage reaches the target level, when the comparing circuit determines that the output current is smaller than the reference current, and
        turn off the transistor when the comparing circuit determines that the output current is greater than the reference current.

2. The switching control circuit of claim 1, wherein the reference voltage generating circuit generates the first reference voltage, which is such a voltage that the reference current is reduced with reduction in the output voltage, when the output voltage becomes equal in level to a first level that is lower than the target level.

3. The switching control circuit of claim 1, wherein the reference voltage generating circuit comprises:
    a first bias current source coupled to the input voltage and providing a first bias current;
    a first P-type metallic oxide semiconductor (PMOS) transistor coupled between the first bias current source and a ground and having a second voltage level applied at a gate of the first PMOS transistor;
    a first resistor and a second bias current source coupled in series between the input voltage and ground with the first resistor coupled to the input voltage, wherein the second bias current source providing a second bias current; and
    a second resistor and a second PMOS transistor coupled in series between the connection point of the first bias current source to the first PMOS transistor and the connection point between the first resistor and the second bias current source, the second PMOS having a gate coupled to a feedback voltage that is proportional to the output voltage;
    wherein the first reference voltage is produced at the connection point of the first resistor and the second bias current source.

4. The switching control circuit of claim 1, wherein the voltage corresponding to the output current is at the input electrode of the transistor, wherein a resistor is connected in series between the input electrode of the transistor and the input voltage.

5. The switching control circuit of claim 2, wherein the reference voltage generating circuit includes:
    a resistor; and
    a bias current circuit configured to supply a bias current to the resistor, and vary a current value of the bias current with reduction in the output voltage when the output voltage reaches the first level, in order to generate the first reference voltage at an end of the resistor.

6. The switching control circuit of claim 2, wherein the driving circuit includes:
    an oscillating circuit configured to output an oscillating signal whose frequency is reduced with reduction in the output voltage;
    an error amplifying circuit configured to amplify an error between the feedback voltage and the reference voltage; and
    a control circuit configured to turn on/off the transistor at a frequency of the oscillating signal based on an output of the error amplifying circuit and the oscillating signal so that the output voltage reaches the target level when the output current is smaller than the reference current, and to turn off the transistor when the output current is greater than the reference current.

7. The switching control circuit of claim 3, wherein the second bias current is larger than the first bias current.

8. The switching control circuit of claim 6, wherein the oscillating circuit reduces the frequency of the oscillating signal when the output voltage reaches a second level that is lower than the first level.

9. A switching control circuit configured to prevent overcurrent through a transistor that is switched to provide an output voltage at a target level, the switching control circuit comprising:
    a resistor connected between a source terminal of the transistor and an input voltage;
    a reference voltage generating circuit configured to generate a first reference voltage indicative of a reference current and that varies inversely with the output voltage when the output voltage is between a first voltage level and a second voltage level, wherein the first reference voltage is constant when the output voltage is below the first voltage level and above the second voltage level;
    a comparing circuit that compares a voltage at the source of the switching transistor with the first reference voltage, wherein the voltage at the source electrode of the transistor is indicative of an output current through the transistor; and
    a driving circuit configured to:
        turn on/off the transistor based on a feedback voltage corresponding to the output voltage and a second reference voltage corresponding to the target level so that the output voltage reaches the target level, when the comparing circuit determines that the output current is smaller than the reference current, and
        turn off the transistor when the comparing circuit determines that the output current is greater than the reference current.

10. The switching control circuit of claim 9, wherein the reference voltage generating circuit generates the first reference voltage so that the reference current is reduced with reduction in the output voltage when the output voltage becomes equal in level to a first level that is lower than the target level.

11. The switching control circuit of claim 9, wherein the reference voltage generation circuit comprises:
a first bias current source coupled to the input voltage and providing a first bias current;
a first P-type metallic oxide semiconductor (PMOS) transistor coupled between the first bias current source and a ground and having the second voltage level applied at a gate of the first PMOS transistor;
a first resistor and a second bias current source coupled in series between the input voltage and ground with the first resistor coupled to the input voltage, wherein the second bias current source providing a second bias current; and
a second resistor and a second PMOS transistor coupled in series between the connection point of the first bias current source to the first PMOS transistor and the connection point between the first resistor and the second bias current source, the second PMOS having a gate coupled to a feedback voltage that is proportional to the output voltage;
wherein the first reference voltage is produced at the connection point of the first resistor and the second bias current source.

12. The switching control circuit of claim 10, wherein the reference voltage generating circuit includes:
a resistor; and
a bias current circuit configured to supply a bias current to the resistor, and vary a current value of the bias current with reduction in the output voltage when the output voltage reaches the first level, in order to generate the first reference voltage at an end of the resistor.

13. The switching control circuit of claim 10, wherein the driving circuit includes:
an oscillating circuit configured to output an oscillating signal whose frequency is reduced with a reduction in the output voltage;
an error amplifying circuit configured to amplify an error between the feedback voltage and the reference voltage; and
a control circuit configured to turn on/off the transistor at a frequency of the oscillating signal based on an output of the error amplifying circuit and the oscillating signal so that the output voltage reaches the target level when the output current is smaller than the reference current, and to turn off the transistor when the output current is greater than the reference current.

14. The switching control circuit of claim 11, wherein the second bias current is larger than the first bias current.

15. The switching control circuit of claim 13, wherein the oscillating circuit reduces the frequency of the oscillating signal when the output voltage reaches a second level that is lower than the first level.

16. A method of forming a switching control circuit that prevents overcurrent through a transistor that is switched to provide an output voltage at a target level, the method comprising:
forming a resistor connected between a source terminal of the transistor and an input voltage;
forming a reference voltage generating circuit to generate a first reference voltage indicative of a reference current and that varies inversely with the output voltage when the output voltage is between a first voltage level and a second voltage level, wherein the first reference voltage is constant when the output voltage is below the first voltage level and above the second voltage level;
forming a comparing circuit to compare a voltage at the source of the switching transistor with the first reference voltage, wherein the voltage at the source electrode of the transistor is indicative of an output current through the transistor; and
forming a driving circuit configured to:
turn on/off the transistor based on a feedback voltage corresponding to the output voltage and a second reference voltage corresponding to the target level so that the output voltage reaches the target level, when the comparing circuit determines that the output current is smaller than the reference current, and
turn off the transistor when the comparing circuit determines that the output current is greater than the reference current.

17. The method of claim 16, wherein forming the reference voltage generating circuit comprises forming the reference voltage generating circuit to generate the first reference voltage so that the reference current is reduced with reduction in the output voltage when the output voltage becomes equal in level to a first level that is lower than the target level.

18. The method of claim 16, wherein:
forming the driving circuit includes:
forming an oscillating circuit that outputs an oscillating signal whose frequency is reduced with a reduction in the output voltage;
forming an error amplifying circuit that amplifies an error between the feedback voltage and the reference voltage; and
forming a control circuit that turns on/off the transistor at a frequency of the oscillating signal based on an output of the error amplifying circuit and the oscillating signal so that the output voltage reaches the target level when the output current is smaller than the reference current, and to turn off the transistor when the output current is greater than the reference current.

19. The method of claim 16, wherein forming the reference voltage generating circuit comprises:
forming a first bias current source coupled to the input voltage and providing a first bias current;
forming a first P-type metallic oxide semiconductor (PMOS) transistor coupled between the first bias current source and a ground and having the second voltage level applied at a gate of the first PMOS transistor;
forming a first resistor and a second bias current source coupled in series between the input voltage and ground with the first resistor coupled to the input voltage, wherein the second bias current source providing a second bias current that is larger than the first bias current; and
forming a second resistor and a second PMOS transistor coupled in series between the connection point of the first bias current source to the first PMOS transistor and the connection point between the first resistor and the second bias current source, the second PMOS having a gate coupled to a feedback voltage that is proportional to the output voltage;
wherein the first reference voltage is produced at the connection point of the first resistor and the second bias current source.

20. The method of claim 17, wherein
forming the reference voltage generating circuit includes:
- forming a resistor; and
- forming a bias current circuit configured to supply a bias current to the resistor and vary a current value of the bias current with reduction in the output voltage when the output voltage reaches the first level, in order to generate the first reference voltage at an end of the resistor.

* * * * *